US007013466B2

(12) United States Patent
Carey et al.

(10) Patent No.: US 7,013,466 B2
(45) Date of Patent: Mar. 14, 2006

(54) METHOD AND SYSTEM FOR SUPPORTING OBJECT ORIENTED PROGRAMMING CLASS REPLACEMENT

(75) Inventors: James Edward Carey, Rochester, MN (US); Marybeth Gurski, Rochester, MN (US); Michael Terry Payne, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 10/093,160

(22) Filed: Mar. 7, 2002

(65) Prior Publication Data

US 2003/0172192 A1     Sep. 11, 2003

(51) Int. Cl.
    G06F 9/44        (2006.01)
(52) U.S. Cl. ...................... 719/316; 717/108; 717/116; 717/120
(58) Field of Classification Search ................ 719/310, 719/315, 316; 717/101, 102, 108, 116, 165, 717/114, 120; 707/3, 103 R
    See application file for complete search history.

(56) References Cited

U.S. PATENT DOCUMENTS

| 5,634,129 | A | * | 5/1997 | Dickinson ................... 719/315 |
| 6,003,037 | A | * | 12/1999 | Kassabgi et al. ......... 707/103 R |
| 6,253,253 | B1 | | 6/2001 | Mason et al. |
| 6,292,824 | B1 | | 9/2001 | Siksa |
| 6,353,859 | B1 | * | 3/2002 | McKeehan et al. ......... 719/315 |
| 6,704,805 | B1 | * | 3/2004 | Acker et al. ................ 719/315 |
| 6,820,267 | B1 | * | 11/2004 | Christensen et al. ........ 719/315 |
| 6,836,889 | B1 | * | 12/2004 | Chan et al. ................. 719/310 |
| 2003/0149689 | A1 | * | 8/2003 | Chow et al. .................... 707/3 |

OTHER PUBLICATIONS

Linden "Just JAVA" 1997, pp. 46-49.*
Piccinelli et al. "Mapping service components to EJB business objects" 2001 IEEE, pp. 169-173.*
Lee et al., "the design and implementation of enterprise Javabean (EJB) wrapper for legacy system" 2001 IEEE, pp. 1988-1992.*
James Edward Carey, "an Francisco Patterns", Chapter 3-Class Replacement, pp. 23-32.

* cited by examiner

*Primary Examiner*—William Thomson
*Assistant Examiner*—Van Nguyen
(74) *Attorney, Agent, or Firm*—Dillon & Yudell LLP (57) ABSTRACT

A method and system for accessing a home object in an object oriented programming (OOP) environment using a locator object capable of locating a home object for a class or a subclass. The locator object supports inheritance for itself, and is capable of locating a home for either an OOP superclass or subclass. By providing a mechanism for locating the home for either the superclass or subclass, preferably in a static manner, client code may be reused with subclasses without having to change code.

12 Claims, 10 Drawing Sheets

METHOD AND SYSTEM FOR SUPPORTING OBJECT ORIENTED PROGRAMMING CLASS REPLACEMENT

BACKGROUND OF THE INVENTION

1. Technical Field

The present invention relates in general to the field of computers, and, in particular, to the field of computer software. Still more particularly, the present invention relates to an improved method and system for managing, including locating, object classes in an object oriented programming environment.

2. Description of the Related Art

Object-oriented programming (OOP) is a type of computer programming used in the development of operating software as well as application software for a computer system. Contrary to traditional procedural programming techniques, OOP comprises and uses pre-engineered "methods" and "variables" that make up an "object" of computer code. When an object is populated with specific data, the object is called an "instance."

An instance is created by a "class," which is a software template from which an object is instantiated. The class defines both the methods (software algorithms) used by the object as well as the format of variables (e.g. integers, strings, pointers to other objects, etc.) used by the methods.

Instances can be persisted by many means. In many cases instances are mapped to relational database tables with each instance being a row in the table. No matter what means is used to persist the instance, some way of working with the persisted instances is needed. In the case of a relational database, some way of locating the newly created instance into the database is needed as well as some means of locating instances within the database. This can be done using another object that acts as an intermediary called the "home."

Figure 1:
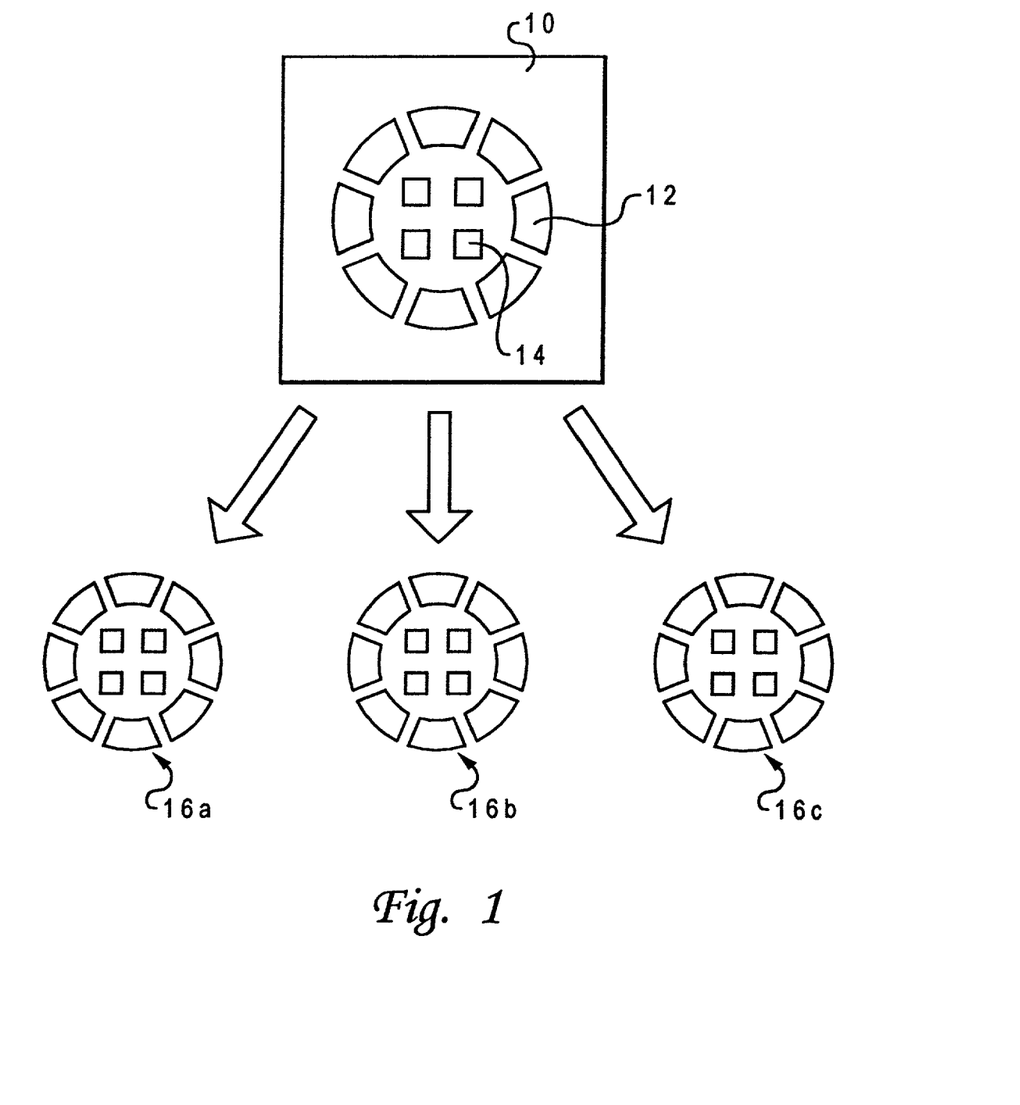
FIG. 1 depicts the prior art construction of an object class and instances of that class.

FIG. 1 depicts graphically the relationship between classes, methods, variables and instances. Class 10 contains the software template that defines methods 12 and variables 14 to be included in a particular object. Methods 12 and variables 14 are defined only once in the definition of the class. Class 10 defines how instances 16 (depicted as instances 16a–16c) are built, with each instance 16 being populated with data values that represent that instance 16's particular contents and location.

The concept of both methods and variable being contained inside an object is called "encapsulation." Part of the concept of encapsulation is that an object has a predictable way of communicating with other objects by sending "messages" back and forth through a well defined software interface. A message from a sending object contains the name of the intended receiving object plus the name of a method contained in the receiving object that the sending object wants to be performed. If the method to be performed requires any additional information in order to know precisely what to do, the message includes that information as a collection of data elements called "parameters."

OOP also incorporates the feature of "inheritance", which is a mechanism whereby one class can be defined as a special case of a more general class, automatically including the method and data (variable) definitions of the general class. These special cases of a class are known as "subclasses" of that class; the more general class, in turn, is known as the "superclass" of its special cases. In addition to the methods and data variables they inherit, subclasses may define their own methods and variables and may override any of the inherited characteristics.

Inheritance allows reuse of the software that is using a more general class. Writing the software to use the more general class allows subclasses to be substituted at run time. Thus the using software is written to use the appropriate message and the chosen subclass provides the particular implementation (method) that handles the message. This technique is often used when writing reusable software. The use of inheritance allows the reusable software to be easily customized by creating new subclasses and using them polymorphically in place of the superclass.

Figure 2:
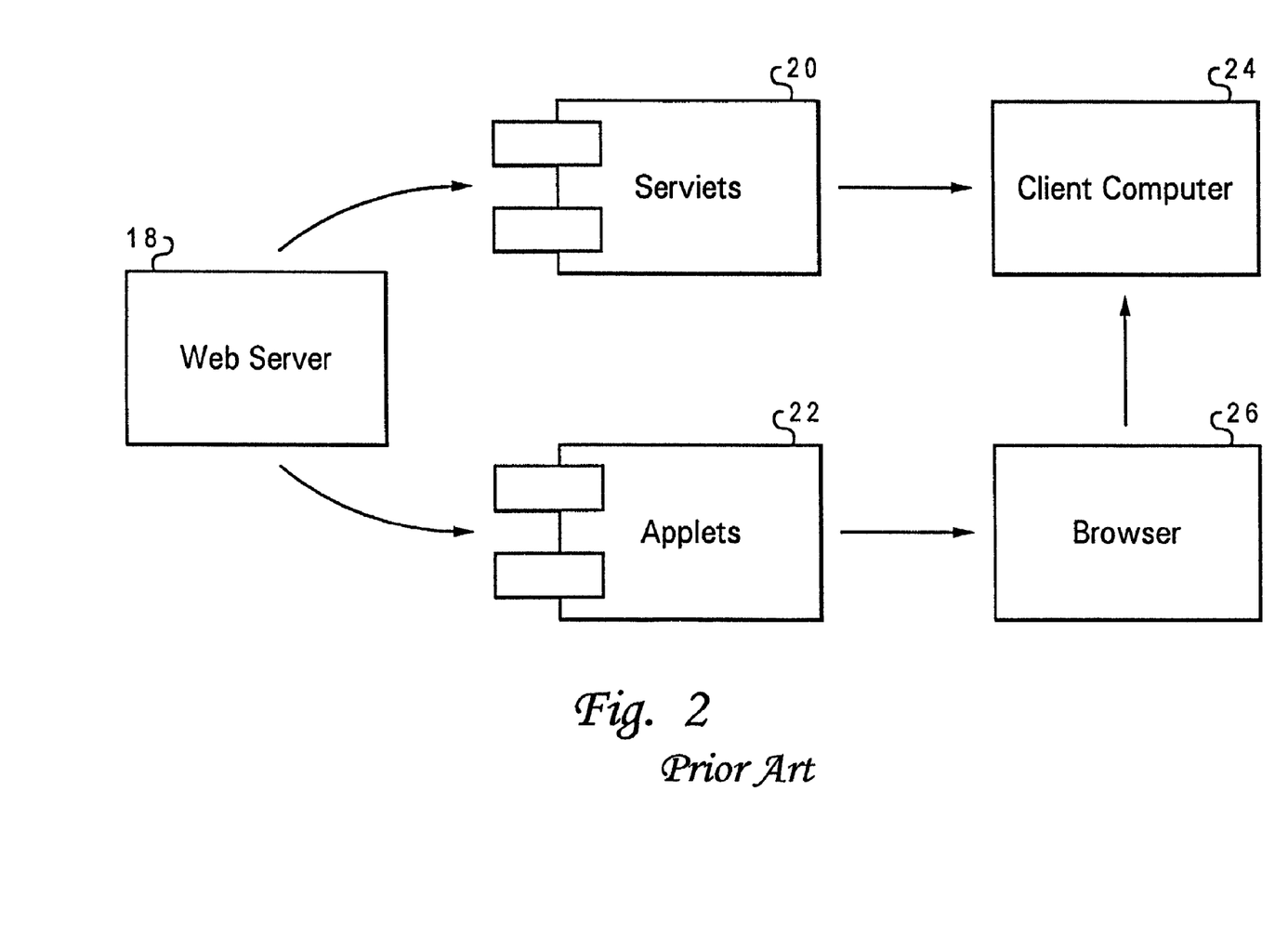
FIG. 2 illustrates an example of prior art hardware used in client-side object oriented programming operations.

OOP is implemented in two ways: client-side operations and server-side operations. Most of the earlier OOP operations were client-side, including those performed using Java™, a platform independent object-oriented programming language developed by Sun Microsystems, Inc. (Sun). Examples of client-side operations include servlets 20 and applets 22 as illustrated in FIG. 2. Applets 22 are portable Java programs that can be downloaded on the fly and can execute in an untrusted environment. Typically, applets 22 are deployed in a Web page sent from Web server 18 to client computer 24, whose browser 26 contains a browser applet viewer to run applet 22. Applets 22 typically display a user interface on client computer 24. Servlets 20 are applets that run on Web server 18 in Web server's servlet engine. Servlets 20 are networked components that can be used to extend the functionality of Web server 18. Servlets 20 are request/response oriented, in that they take requests from browser 26 and issue a response back to client computer 24. Servlets 20 are often used for performing Web tasks such as rendering a HyperText Markup Language (HTML) interface to an e-commerce catalog.

Figure 3:
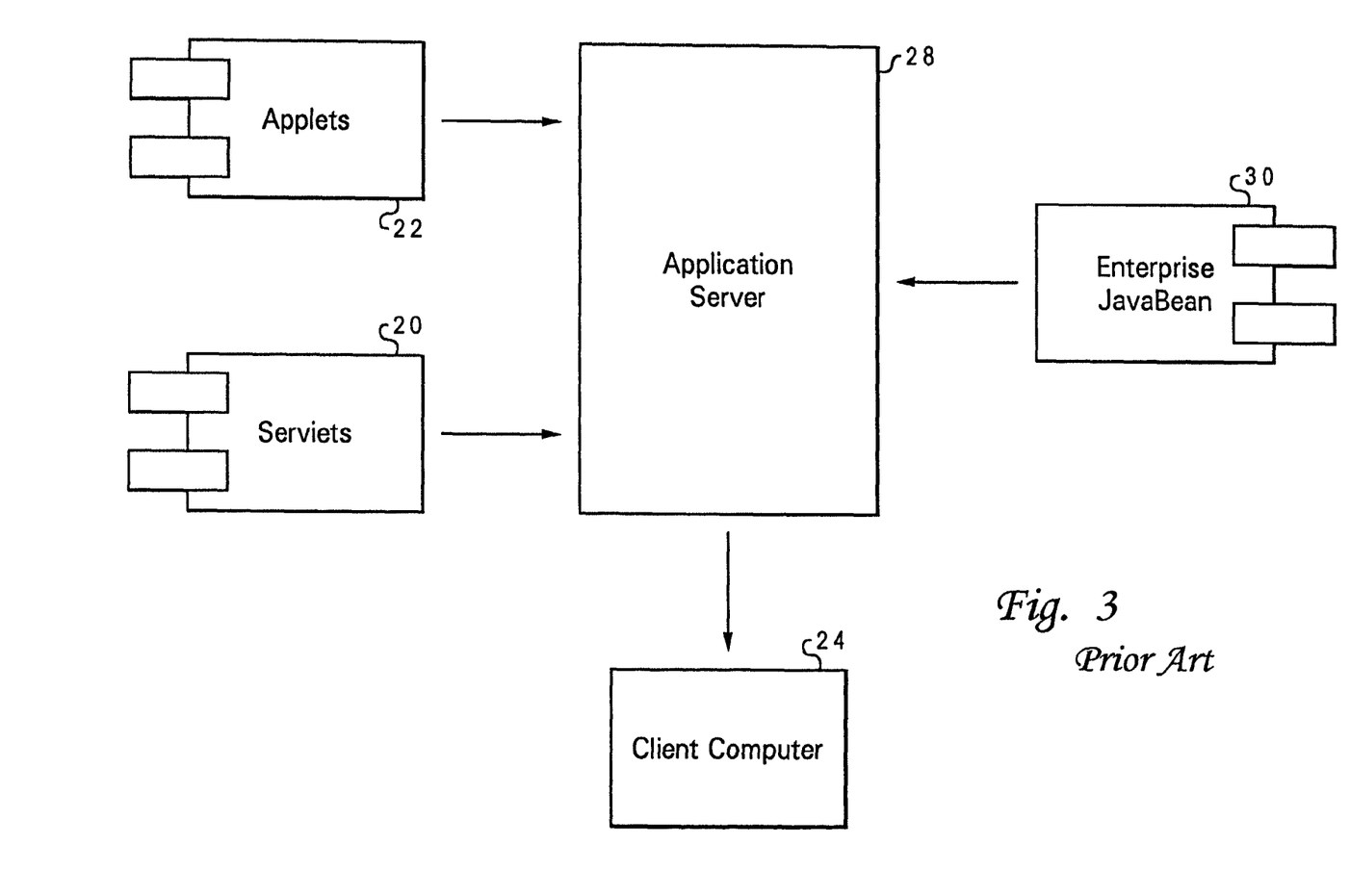
FIG. 3 depicts prior art hardware used in server-side object oriented programming (OOP) operations.

Server-side operations are those that operate typically in an application server 28, as depicted in FIG. 3. Applications are sent from application server 28 to client computer 24 typically upon a request from client computer 24. Server-side operations are useful in executing complex algorithms or performing high-volume business transactions. Application server 28 provides a highly available, fault-tolerant, transactional and multiuser secure environment. While applets 22 and servlets 20 may be deployed in server-side operations, Enterprise JAVABeans objects 30 are primarily used for server-side operations.

Java 2 Platform, Enterprise Edition™ (J2EE), developed by Sun, is a robust suite of middleware services for developing server-side applications. An integral part of J2EE are Enterprise JAVABEANS™ (EJB), which define a server-side architecture that enables and simplifies the process of building enterprise-class (appropriate for a large enterprise, i.e. business organization) enterprise objects 30. EJB allows the writing of scalable, reliable and secure applications in a platform-independent environment similar to that found when using Java. Thus EJB components can be provided from a variety of vendors, and simply "plugged in" to a network system.

Figure 4:
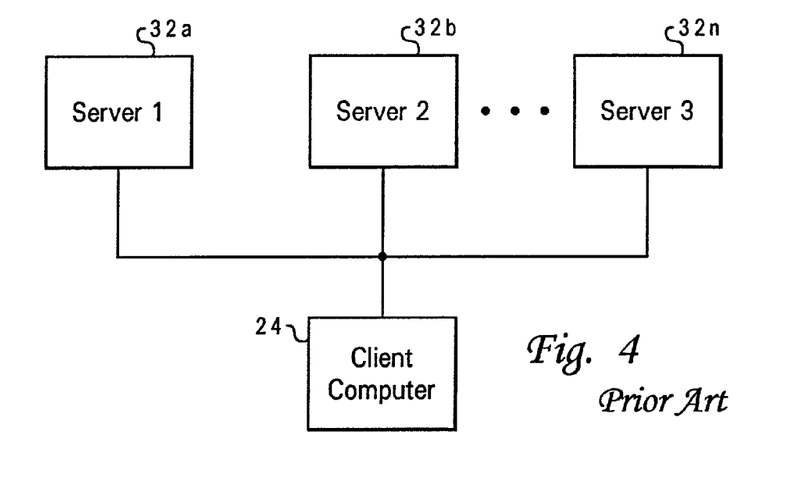
FIG. 4 illustrates a prior art multi-tier computer network.

EJB incorporates the use of server-side software components called enterprise beans, which can be deployed in a distributed multi-tier environment illustrated in FIG. 4. In a multi-tier environment, client computer 24 has limited resident application software, and thus is called a "thin" client. The majority of the software applications and data are distributed across multiple servers 32, each of which may be an embodiment of application server 28, Web server 18, or any other data or application server. EJB defines two different kinds of enterprise beans: session beans and entity beans.

Session beans represent work being performed for client code that is calling it. Session beans are business process objects that implement business logic, business rules, and workflow. Examples of session beans are price quoting, order entry, inventory methods, etc. They are reusable components that contain logic for business processes, and typically are instantiated only for the length of time the client is using the session bean. When the client disconnects from the application server, terminating the session, the session bean is typically destroyed (although not its class).

Entity beans represent persistent data, such as bank account records, order histories, personnel records, etc. In many applications, entity beans represent real data objects, such as customers, products or employees.

Figure 5:
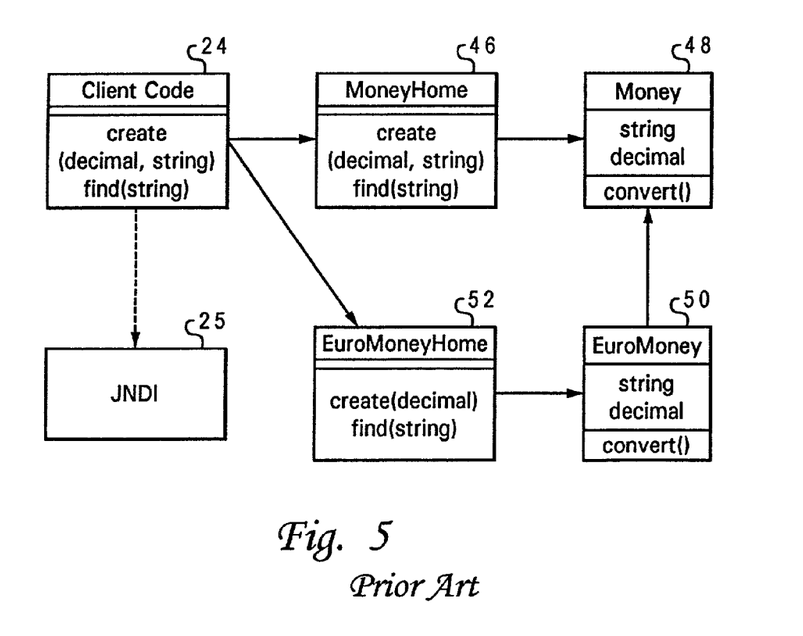
FIG. 5 depicts in block form how prior art located subclasses of objects.

EJB uses homes to access the database associated with an Entity. Each Entity has a home. A home is associated with a particular table as part of 'deployment'. This association is done via a look-up table, such as a Java Naming Directory Interface (JNDI) table 25, as depicted in FIG. 5. Client code typically will always look-up the home to use in JNDI. This allows the deployer to choose different tables or servers on which to persist the tables.

As described above, a class, as well as its enterprise entity bean instances, can inherit methods and variables from a parent or "superclass." For example, consider the entity object classes for Money class 48 and EuroMoney class 50, depicted in FIG. 5. MoneyHome 46 is an intermediary object for locating the Money class 48 that is to be created. For example, MoneyHome 46 may work with a table, and Money class 48 may be define as a mapping into a row layout (as part of deployment), including the size and format of the row. Thus, Money class 48 may define a row having a name field for a currency name (string format) and a currency field for U.S. Dollars (formatted to 0.01 decimals). For example, the row defined by Money class 48 for U.S. Currency, where the currency is described in 0.01 Decimals and the name of the currency (U.S. Dollars) is a string of characters, would be:

| .01 Decimal | String |
| --- | --- |

When populated by specific names and figures, Money class 48 is said to instantiate an instance, typically called "money."

Subsequently, a programmer may wish to have a new class which has different behavior or attributes. The EuroMoney subclass 50 inherits the methods and attributes from Money class 48 and changes the behavior of the "convert" method from Money class 48. The "convert" method on Money class 48 looks up the exchange rate and uses the maximum precision allowed by decimal. The "convert" method on EuroMoney subclass 50 conforms to the Euro requirements that specific steps with specific precision be used when converting to Euro from a currency moving to the Euro, such as German marks. EuroMoney subclass 50 could also add an additional currency and decimal to allow it to hold the original currency and value as well as the Euro currency and value. By changing the "convert" method, subclass EuroMoney subclass 50 is created. New row layouts for EuroMoney subclass 50 are defined during deployment and can either be mapped to the same table as the Money class 48 or to its own table. When the new object EuroMoney subclass 50 is created, EuroMoneyHome 52 is also created, either by the programmer or automatically by the environmental software. If Money class 48 and EuroMoney subclass 50 are deployed to the same table (called deployed with inheritance), then both Money class 48 and EuroMoney subclass 50 are visible from the MoneyHome 46. No matter how they are deployed, only the EuroMoney subclass 50 is visible from the EuroMoneyHome 52.

While the EuroMoney subclass 50 has inheritance from the Money class 48, there is no inheritance between MoneyHome 46 and EuroMoneyHome 52. That is, EJB and the JAVA specifications do not permit MoneyHome 46 having a method signature Money create (Decimal)

to have a subclass EuroMoneyHome 52 with a method signature

EuroMoney create (Decimal).

That is, two methods may not only differ in their return value. Also, the EJB specification of home classes requires the create method to always return the type of the entity they are the home for. For example, the MoneyHome 46 "create" method must return Money class 48 and EuroMoneyHome 52's "create" method must return EuroMoney subclass 50. The homes cannot return a superclass of the entity they are associated with.

Code that uses the MoneyHome 46 to create and locate instances of Money class 48 cannot be easily changed to create and locate EuroMoney subclass 50 instances instead. The client code 24 using Money class 48 is written to use the signatures on the MoneyHome 46. EuroMoneyHome 52 cannot be used without modifying the client code 24. The look-up of which home was assigned at deployment doesn't solve the problem because the assigned home must adhere to the correct home interface and as described above EuroMoneyHome 52 cannot be substituted (used polymorphically) for MoneyHome 46 because they cannot have an inheritance relationship.

The benefits of the polymorphic behavior of Money class 46 and EuroMoney subclass 50 cannot be taken advantage of when reusing the client code. In order to use client code, the client code must be modified. This limits the ability to reuse existing code and, when the source code for client code is not available, may make it impossible.

Therefore, there is a need for a method to write client code such that the client code can be programmatically switched to create and locate subclasses. Thus the client code should be able to locate and use the correct home for the subclass or its parent class as appropriate.

SUMMARY OF THE INVENTION

The present invention is therefore a method and system for accessing a home object in an object oriented programming (OOP) environment using special home policies, which are configurable locator objects capable of locating a home object for a class or a subclass.

Reusable client code creates and locates OOP objects. Creation is done using an class called a factory. The factory sends instructions for creating a class through a special home policy to a home where the class is created. The OOP objects managed by the home are found by exposing finder methods from the home object on the special home policy. Thus when reusable code wants to find an OOP object, the reusable code first gets the special home policy and requests that the special home policy find the requested OOP object. The special home policy finds the proper home and directs the OOP object request to the proper home.

The special home policy is located by look-up. Thus the special home policy used by the factory or reusable client code can be changed by reconfiguring the look-up to point to a different special home policy.

A subclass of the object class may be created. To do so, new code specific for the subclass, and a new special home policy, which has been created based on (inheriting) the special home policy of the superclass is created. The new special home policy is capable of providing methods from the special home policy. Thus the new special home policy is able to direct the methods defined on its superclass, including the method used to create and define the parent class, to the methods on the new home. The new special home policy is able to locate the new home for the subclass for both creating and later finding the subclass. Thus, the new special home policy inherits from the special home policy, and a finder can locate either the class or subclass from the new special home policy. Thus to use the new subclass with the reusable client code, the special home policy look-up used by the reusable client code is reconfigured to return the new special home policy, which locates the new home and directs requests to it.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 6:
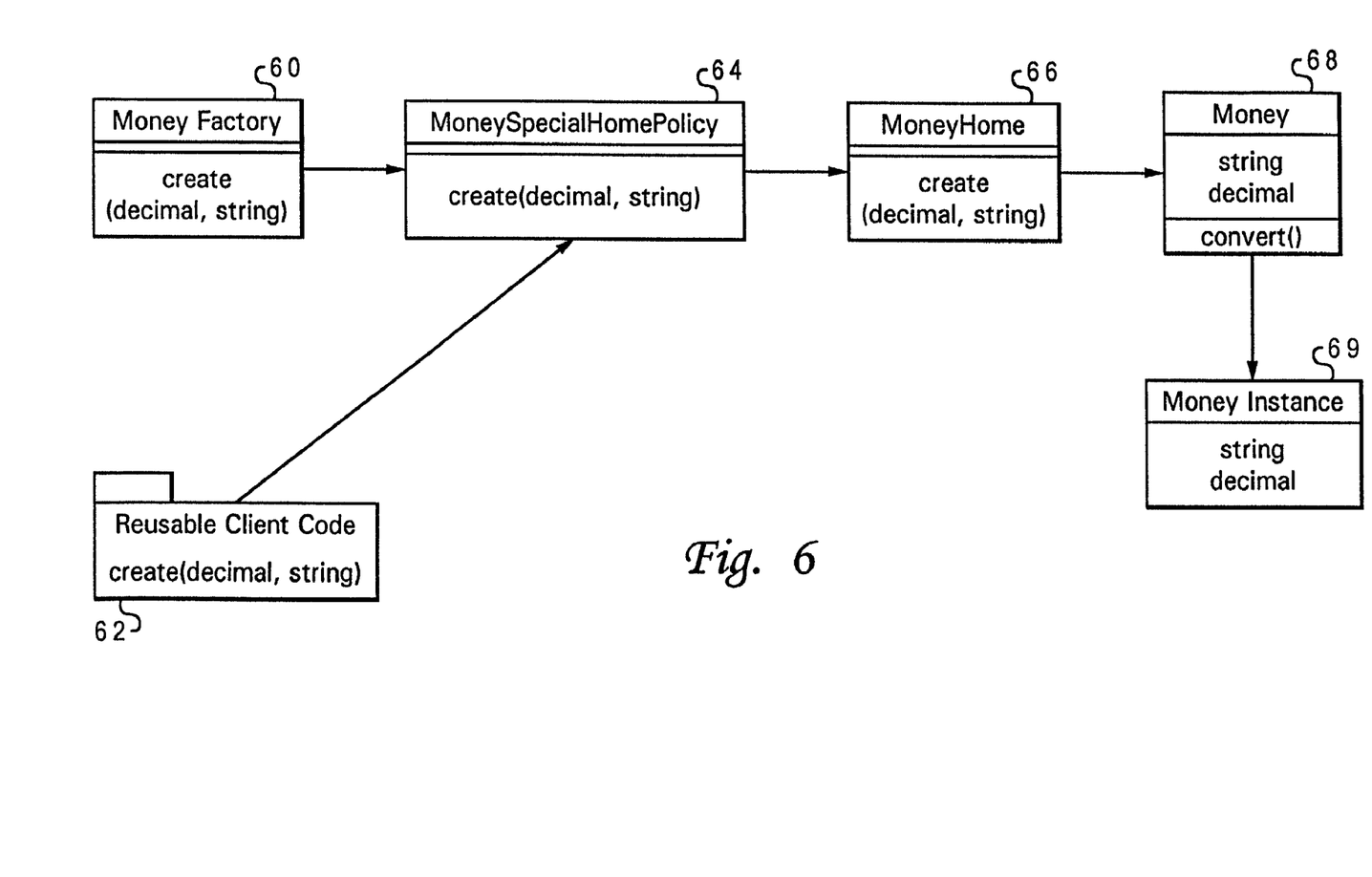
FIG. 6 illustrates an inventive home locator object in an environment having no subclasses of an OOP class.

With reference now to FIG. 6, there is depicted a software block diagram of a first embodiment of the present invention where an object class is created that does not have a subclass. Money Factory 60, a static class, contains "create" code necessary to create Money class 68. That is, Money Factory 60 contains code necessary to create Money class 68, which includes the methods and variable definitions for the money instance 69, which represents data in U.S. "decimal" format (0.01 decimal divisions) for U.S. currency. Money Factory 60 looks up and delegates the "create" code to MoneySpecialHomePolicy 64, which is a locator object capable of locating MoneyHome 66. This lookup can be done via JNDI or can be done by looking for the special home policy on a context object. A lookup can also be implemented so that if the special home policy is not found via the lookup, a default policy can be created and used. MoneyHome 66 is an object that creates and finds class objects. In the case of Enterprise Java Bean (EJB) object oriented programs (OOP), MoneyHome 66 creates and finds EJB (class) objects. Concurrently, reusable client code 62 provides code defining a characteristic of Money class 68 to be created. That is, the client code 62 can either use the Money Factory 60 described above or it can access the special home policy itself as described below.

In the example shown in FIG. 6, Money Factory 60 and reusable client code 62 look up and then send code for "create(decimal string)" to MoneySpecialHomePolicy 64. MoneySpecialHomePolicy 64 then locates MoneyHome 66 to create Money class 68 using the "decimal" format for money variables, after which Money class 68 may populate variable fields in Money class 68 with specific data to instantiate Money Instance 69. The Money Factory 60 encapsulates the code that would be identical each time Reusable Client Code 62 needed to create Money class 68.

Figure 7:
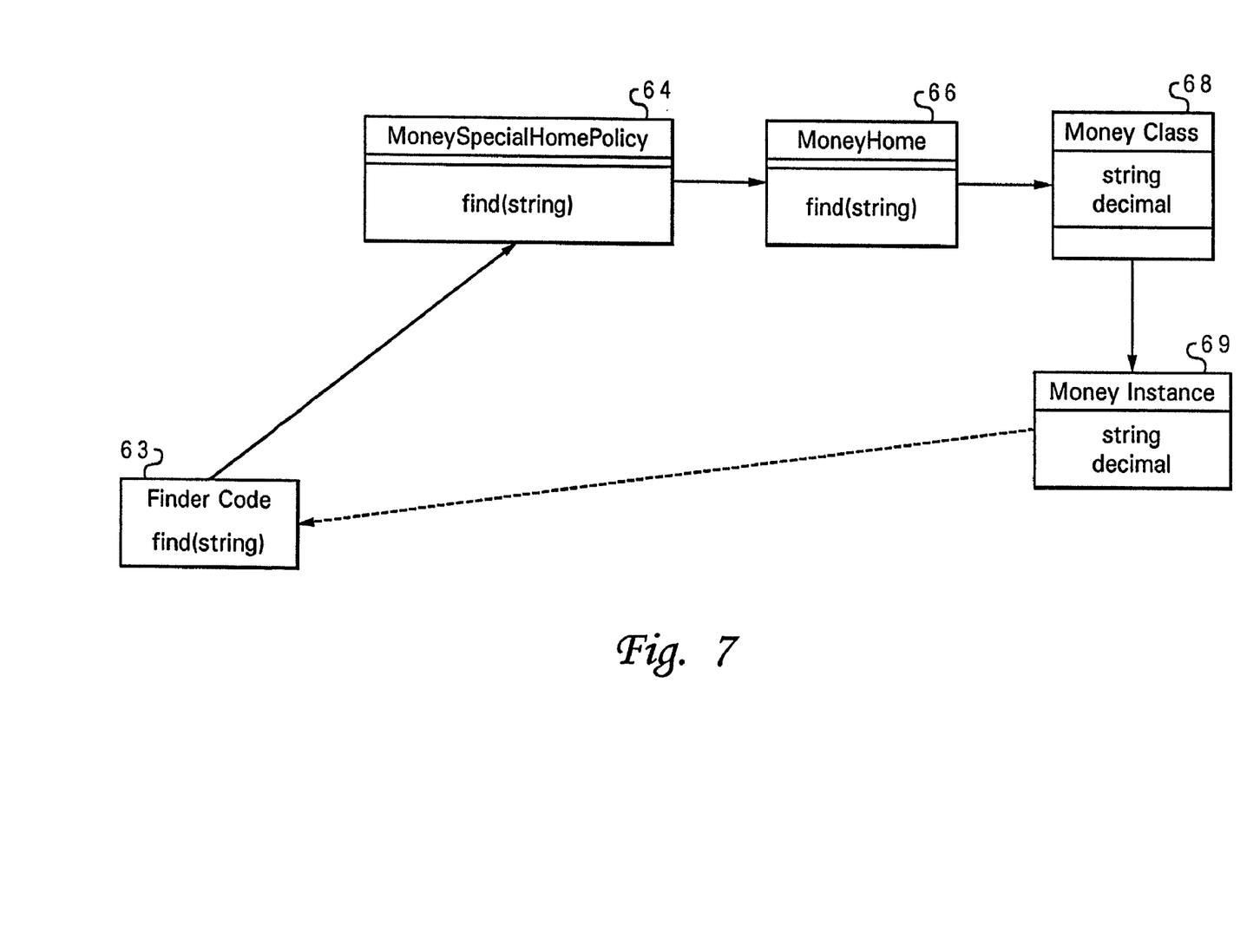
FIG. 7 depicts the use of finder code with the home locator object to locate an instance of the OOP class.

Referring now to FIG. 7, when a client wants to work with the "convert" method on a particular money instance 69, finder code 63 looks up the MoneySpecialHomePolicy 64 and issues a "find" instruction to MoneySpecialHomePolicy 64, which locates MoneyHome 66 and directs the find request to it. That is, finder code 63 calls the procedure "find( )" using the characteristic "String," resulting in the command "find(String)," to MoneySpecialHomePolicy 64, which is capable of finding Money class 68 as defined above. MoneyHome 66 may retrieve information from the database in order to revive the Money instance (or instances) 69 that match the criteria of the "find" request.

Figure 8:
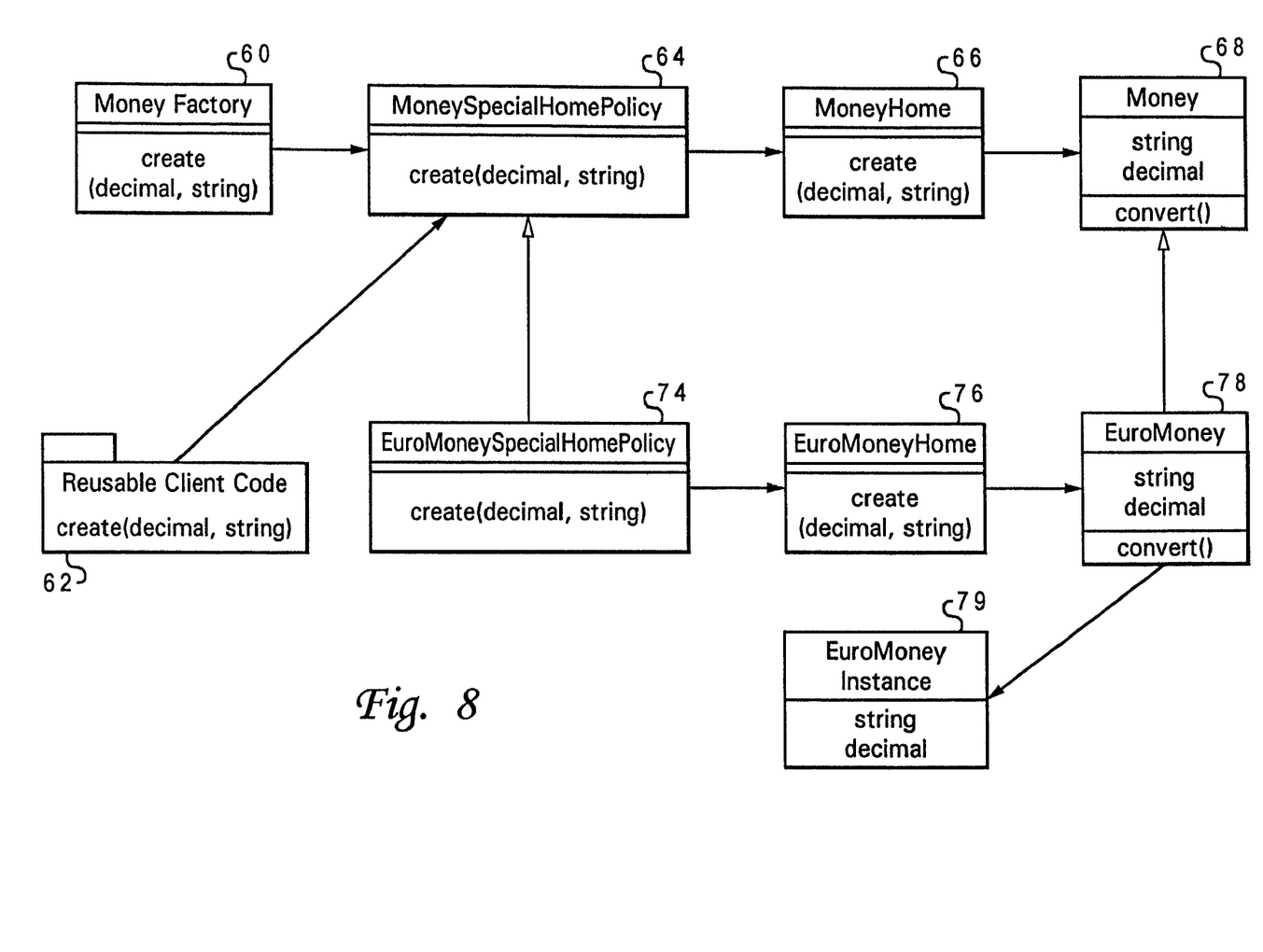
FIG. 8 illustrates a subclass home locator object for creating a subclass of the OOP class.

Referring now to FIG. 8, Money Factory 60 and Reusable Client Code 62 is as described above in FIG. 6. Reusable Client Code 62 is able to substitute EuroMoney subclass 78 for Money class 68. EuroMoney subclass 78 is intended to be used polymorphically with Money class 68 since it uses much of the same code as Money class 68, and thus has "inheritance" from Money class 68. Reusable Client Code 62 and Money Factory 60 create or find money by looking up a special home policy to use and using it. As described above, this lookup can be configured to return MoneySpecialHomePolicy 64 and things work as described above. However, the lookup can also be reconfigured so that EuroMoneySpecialHomePolicy 74 is returned instead. This can be done because of the inheritance between MoneySpecialHomePolicy 64 and EuroMoneySpecialHomePolicy 74. In this case the EuroMoneySpecialHomePolicy 74, which is able to locate EuroMoneyHome 76 is used. EuroMoneyHome 76 is analogous to MoneyHome 66 described in FIG. 7, except that EuroMoneyHome 76 creates or finds EuroMoney instances 79 of the EuroMoney class 78. Note that EuroMoneyHome 76 and MoneyHome 66 have no inheritance relationship between them. Note, however, that EuroMoneySpecialHomePolicy 74 does have inheritance from MoneySpecialHomePolicy 64. Thus, Reusable Client Code 62 and Money Factory 60 can use either MoneySpecialHomePolicy 64 which works with MoneyHome 66 and Money class 68, or EuroMoneySpecialHomePolicy 74 which works with EuroMoneyHome 76 in the creation of EuroMoney subclass 78. Thus reusable code 62 does not have to change when it has to work with EuroMoney subclass 78. Instead, the look up of the special home policy is configured to return EuroMoneySpecialHomePolicy 74.

Figure 9:
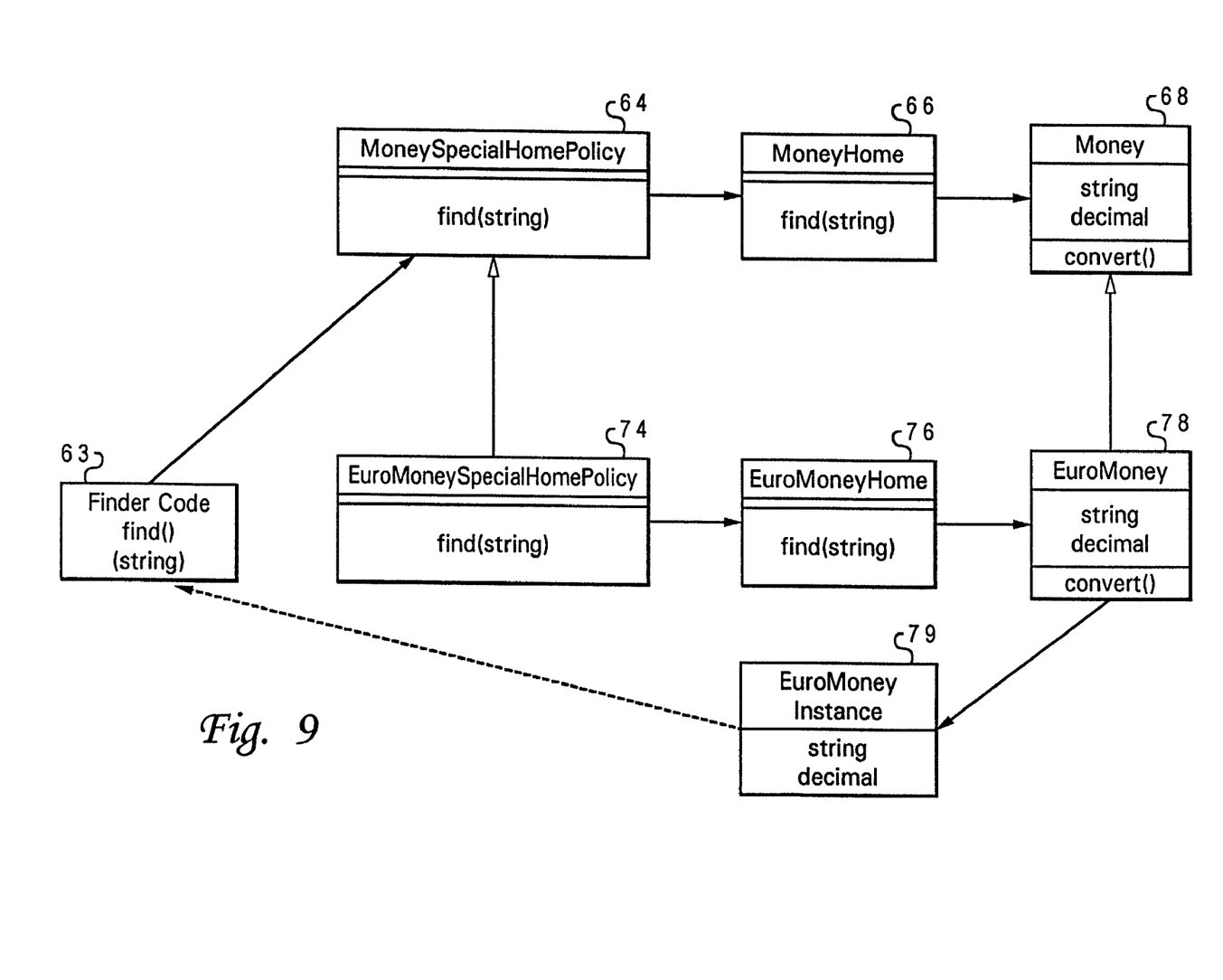
FIG. 9 depicts the use of finder code to locate an instance of the subclass of the OOP class.

Referring now to FIG. 9, Finder Code 63 is used to find instances of Money class 68 (or instances of EuroMoney subclass 79). The Finder Code 63 still looks up and uses a special home policy and directs the find request to the special home policy. If the finder code 63's look up returns MoneySpecialHomePolicy 64, things work as described above. If on the other hand, this look up returns EuroMoneySpecialHomePolicy 74, then the EuroMoneySpecialHomePolicy 74 locates EuroMoneyHome 76 and EuroMoney class78, which can retrieve EuroMoney instance 79 to be returned to Finder Code 63. Thus the Finder Code 63 returns a EuroMoney Instance 79 derived from Money 68 when it uses the "convert" method, thus polymorphically getting the instance defined by the EuroMoney subclass 78. Again, note the inheritance between MoneySpecialHomePolicy 64 and EuroMoneySpecialHomePolicy 74. Having inheritance with MoneySpecialHomePolicy 64, EuroMoneySpecialHomePolicy 74 can be used in the place of MoneySpecialHomePolicy 64.

If a new user wishes to use the EuroMoney class 78, EuroMoney class 78 is accessed directly by the use of the EuroMoneySpecialHomePolicy 74. Thus, if a lookup table is used, EuroMoneySpecialHomePolicy 74 would be in the look up table twice: once for money special home policy and again for euro money special home policy.

Figure 10:
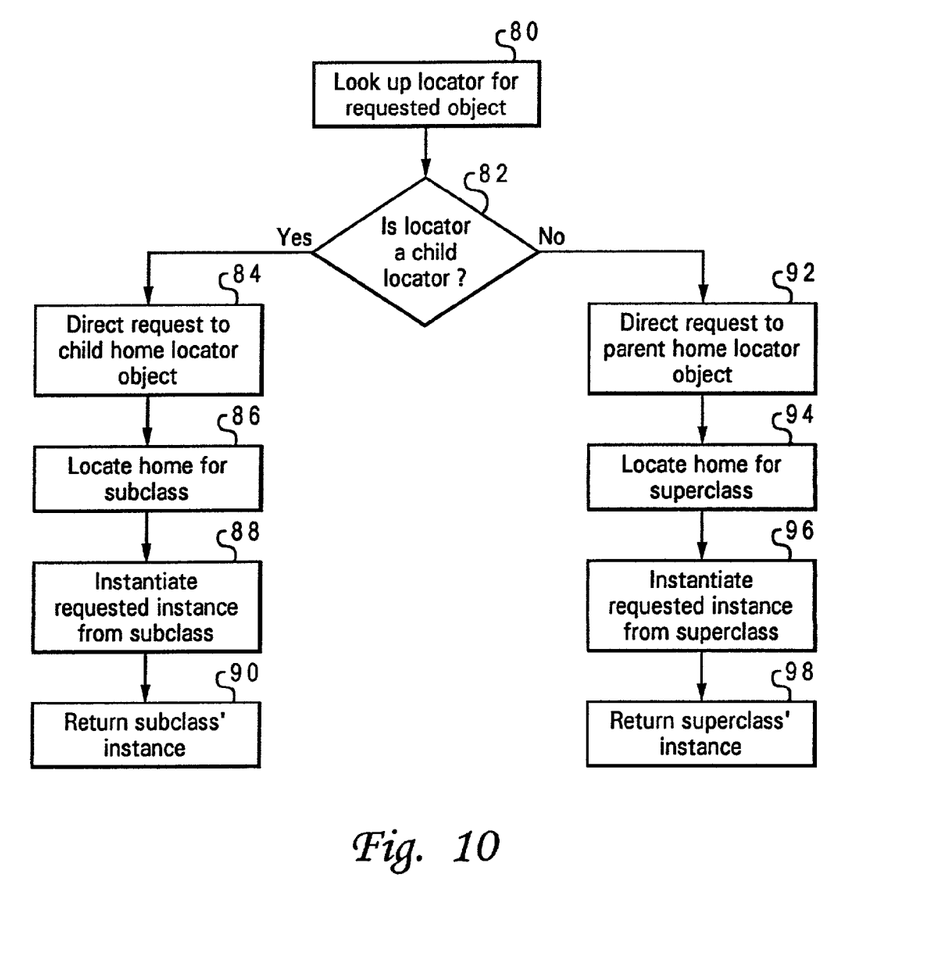
FIG. 10 is a flow-chart of software steps taken to locate an instance of the OOP class or subclass.

With reference now to FIG. 10, there is depicted a block diagram of software logic for finding an object instance. As depicted in block 80, a request for an instance is made by looking up a locator for a class such as "Money" or "EuroMoney" as described in block 80. A determination, as described in query block 82, is made as to whether the locator is a child locator (e.g. EuroMoneySpecialHomePolicy 74 in FIG. 9) or a parent locator (e.g. MoneySpecialHomePolicy 64 in FIG. 9). If a parent locator is returned, then execution continues with block 92, directing the request to the parent home locator object. If a child locator is returned then execution continues with block 84, directing the request to the child home locator object.

If the parent locator object is used, as described in block 92, the home for the superclass (e.g. Money class 68 in FIG. 9) is located, as described in block 94. Instantiation (creation or find) of the instance (or instances) of the superclass is done, as described in block 96. Once instantiated, the instance (or instances) are returned to the requester, as shown in block 98.

As depicted in block 84, if the child locator object, (e.g. EuroMoneySpecialHomePolicy 74 in FIG. 9) is used, the home (e.g. EuroMoneyHome 76 in FIG. 9) for the subclass (e.g. EuroMoney 78 in FIG. 9) is located, as described in block 86. An instantiation (creation or find) of the instance (or instances) of the subclass is done, as described in block 88. Once instantiated, the instance (or instances) are returned, as shown in block 90, to the requester. These subclasses are preferably returned as a superclass, so that they can be used polymorphically.

Figure 11:
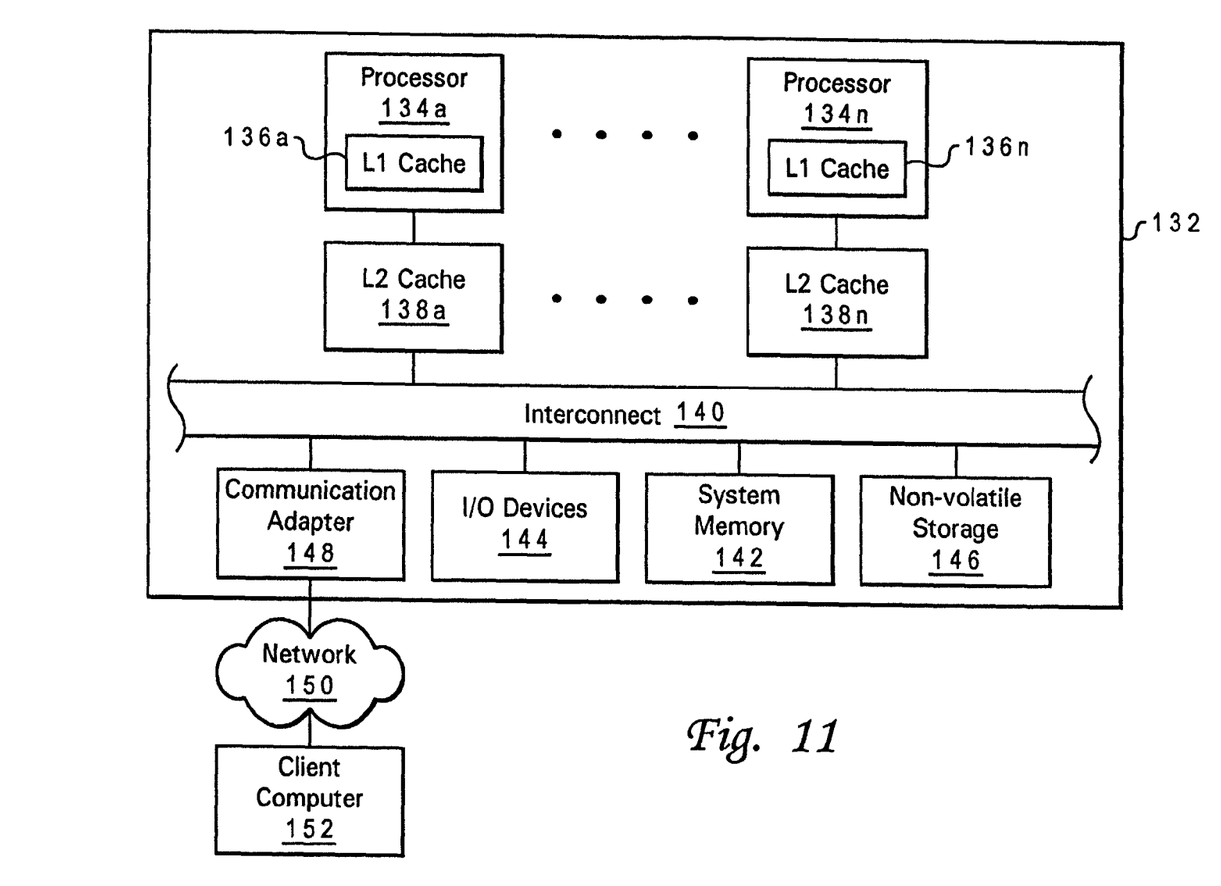
FIG. 11 illustrates an exemplary computer network system for implementing the present invention.

With reference now to FIG. 11, there is illustrated a high-level diagram of preferred embodiment of a network using a server 132 in accordance with the present invention. While only a single server 132 is depicted for clarity, in the preferred embodiment multiple servers 132 are connected to network 150 to provide multiple resources for methods and classes used by client computer 152. As depicted, server 132 is a data processing system that preferably includes multiple processing units 134a–134n. In addition to conventional registers, instruction flow logic and execution units utilized to execute program instructions (not shown), each of processing units 134a–134n also includes an associated one of on-board level one (L1) caches 136a–136n, which temporarily stores instructions and data that are likely to be accessed by the associated processor. Although L1 caches 136a–136n are illustrated in FIG. 11 as unified caches that store both instruction and data (both referred to hereinafter simply as data), those skilled in the art will appreciate that each of L1 caches 136a–136n could alternatively be implemented as bifurcated instruction and data caches.

In order to minimize access latency, server 132 also includes one or more additional levels of cache memory, such as level two (L2) caches 138a–138n, which are utilized to stage data to L1 caches 136a–136n. L2 caches 138a–138n function as intermediate storage between system memory 142 and L1 caches 136a–136n, and can typically store a much larger amount of data than L1 caches 136a–136n, but at a longer access latency. As noted above, although FIG. 11 depicts only two levels of cache, the memory hierarchy of server 132 could be expanded to include additional levels (L3, L4, etc.) of serially-connected or look aside caches. Finder code 63, reusable client code 62 and code found in money factory 60, as depicted in FIGS. 6–9, are preferably located in system memory 142 and are all cachable.

As illustrated, server 132 further includes I/O devices 144, a system memory 142, and a non-volatile storage 146, which are each coupled to interconnect 140. I/O devices 144 comprise conventional peripheral devices, such as a display device, keyboard, and graphical pointer, which are interfaced to interconnect 140 via conventional adapters. Non-volatile storage 146 stores an operating system and other software, which are loaded into volatile system memory 142 in response to server 132 being powered on.

Further connected to interconnect 140 is a communication adapter 148, which connects server 132 to client computer 152 via a network 150. Network 150 may be a local area network (LAN) or a wide area network (WAN) such as an Internet. Client computer 152 may be a "thin" computing device having limited resident application software or a "fat" computer device having extensive resident application software.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for accessing a home object in an object oriented programming (OOP) environment, said method comprising;
    accessing a first home locator, said first home locator being an object capable of locating a first home object, said first home object being capable of providing a software environment for managing a first class that is capable of supporting inheritance;
    locating said first home object with said first home locator;
    accessing a second home locator, said second home locator being a subclass of said first home locator, said second home locator being capable of locating a second home object, said second home object being capable of providing a software environment for a second class, said second class being a subclass of said first class; and
    accessing said second home locator to locate said second home object.

2. The method of claim 1, further comprising:
accessing said second home locator through said first home locator to locate said second home object.

3. The method of claim 1, wherein said first home object is an Enterprise JavaBean (EJB) object.

4. The method of claim 1, further comprising:
instantiating an instance of said second class;
locating said instance with a finder code; and
returning said instance to said finder code.

5. A computer network comprising:
means for accessing a first home locator, said first home locator being an object capable of locating a first home object, said first home object being capable of providing a software environment for managing a first class that is capable of supporting inheritance;
means for locating said first home object with said first home locator;
means for accessing a second home locator, said second home locator being a subclass of said first home locator, said second home locator being capable of locating a second home object, said second home object being capable of providing a software environment for a second class, said second class being a subclass of said first class; and
means for accessing said second home locator to locate said second home object.

6. The computer network of claim 5, further comprising:
means for accessing said second home locator through said first home locator to locate said second home object.

7. The computer network of claim 5, wherein said first home object is an Enterprise JavaBean (EJB) object.

8. The computer network of claim 5, further comprising:
means for instantiating an instance of said second class;
means for locating said instance with a finder code; and
means for returning said instance to said finder code.

9. A computer program product, residing on a computer usable medium, for accessing a home object in an object oriented programming (OOP) environment said computer program product comprising:

program code means for accessing a first home locator, said first home locator being an object capable of locating a first home object, said first home object being capable of providing a software environment for managing a first class that is capable of supporting inheritance;

program code means for locating said first home object with said first home locator;

program code means for accessing a second home locator, said second home locator being a subclass of said first home locator, said second home locator being capable of locating a second home object, said second home object being capable of providing a software environment for a second class, said second class being a subclass of said first class; and program code means for accessing said second home locator to locate said second home object.

10. The computer program product of claim 9, further comprising:
program code means for accessing said second home locator through said first home locator to locate said second home object.

11. The computer program product of claim 9, wherein said first home object is an Enterprise JavaBean (EJB) object.

12. The computer program product of claim 9, further comprising:
program code means for instantiating an instance of said second class;
program code means for locating said instance with a finder code; and
program code means for returning said instance to said finder code.

* * * * *